US008655957B2

(12) United States Patent
Duxbury et al.

(10) Patent No.: US 8,655,957 B2
(45) Date of Patent: Feb. 18, 2014

(54) SYSTEM AND METHOD FOR CONFIRMING THAT THE ORIGIN OF AN ELECTRONIC MAIL MESSAGE IS VALID

(75) Inventors: Guy Duxbury, Nepean (CA); Hasler Hayes, Munster Hamlet (CA); Anoop Nannra, Ottawa (CA)

(73) Assignee: Apple Inc., Cupertino, CA (US)

( * ) Notice: Subject to any disclaimer, the term of this patent is extended or adjusted under 35 U.S.C. 154(b) by 2150 days.

(21) Appl. No.: 11/014,509

(22) Filed: Dec. 16, 2004

(65) Prior Publication Data

US 2006/0168028 A1    Jul. 27, 2006

(51) Int. Cl.
*G06F 15/16* (2006.01)
*H04L 12/58* (2006.01)

(52) U.S. Cl.
CPC .................................. *H04L 12/585* (2013.01)
USPC ........... 709/206; 709/201; 709/202; 709/203; 709/204; 709/205; 709/207; 709/217; 709/218; 709/219; 709/220; 709/223; 713/155; 713/170

(58) Field of Classification Search
USPC ......... 709/206, 201, 202, 203, 204, 205, 207, 709/217, 218, 219, 220, 223; 713/155, 170
See application file for complete search history.

(56) References Cited

U.S. PATENT DOCUMENTS

| | | | | |
|---|---|---|---|---|
| 6,085,321 A * | 7/2000 | Gibbs et al. | .................. | 713/170 |
| 6,385,655 B1 * | 5/2002 | Smith et al. | .................. | 709/232 |
| 6,421,673 B1 * | 7/2002 | Caldwell et al. | ................ | 707/10 |
| 6,510,464 B1 * | 1/2003 | Grantges et al. | .............. | 709/225 |
| 6,543,686 B1 * | 4/2003 | Ritter | ............................. | 235/380 |
| 6,615,241 B1 * | 9/2003 | Miller et al. | .................. | 709/206 |
| 6,754,450 B2 * | 6/2004 | Chang et al. | .................... | 398/51 |
| 6,757,711 B2 * | 6/2004 | Toga | .............................. | 709/203 |
| 6,792,085 B1 * | 9/2004 | Rigaldies et al. | .......... | 379/88.13 |
| 6,823,367 B1 * | 11/2004 | Wakasugi et al. | ............. | 709/206 |
| 6,847,994 B1 * | 1/2005 | Akimoto et al. | ............. | 709/223 |
| 7,266,584 B2 * | 9/2007 | Mullen et al. | ................. | 709/206 |
| 7,398,325 B2 * | 7/2008 | Weller | .......................... | 709/247 |
| 7,433,924 B2 * | 10/2008 | Malcolm | ....................... | 709/206 |
| 7,543,076 B2 * | 6/2009 | Mehr et al. | .................... | 709/238 |
| 2002/0007453 A1 * | 1/2002 | Nemovicher | ................. | 713/155 |

(Continued)

*Primary Examiner* — Saket K Daftuar
(74) *Attorney, Agent, or Firm* — Meyertons, Hood, Kivlin, Kowert & Goetzel, P.C.

(57) ABSTRACT

A system and method for preventing e-mail spoofing, in which a receiving e-mail checking server system sends a message to a confirmation server associated with a network domain of the sending system of a received e-mail message, to determine if the sender transmitted the message. The e-mail checking server sends a confirmation request e-mail, including a transmission time or unique message "key" associated with the received e-mail, to the sending domain's confirmation server. When a confirmation request is received at the confirmation server, it replies with an indication whether the message was sent at the time indicated in the confirmation request, and/or whether the message key matches that of a previously transmitted message. The confirmation server checks whether the message was in fact sent based on stored values corresponding to the send time and/or message key stored for the confirmation request message. A message may further include indication that its origin can be confirmed. A receiver may maintain indications of domains capable of confirming sent e-mail messages, and determine a problem has occurred if no confirmations are received from a domain having that capability. An e-mail sender may mark domains from which it expects to receive e-mail confirmation requests, and determine a problem has occurred if e-mail messages sent to such domains fail to send confirmation requests.

36 Claims, 4 Drawing Sheets

(56) References Cited

U.S. PATENT DOCUMENTS

| | | | |
|---|---|---|---|
| 2002/0046250 A1* | 4/2002 | Nassiri | 709/206 |
| 2002/0069254 A1* | 6/2002 | Watanabe et al. | 709/206 |
| 2002/0129275 A1* | 9/2002 | Decuir | 713/201 |
| 2003/0142364 A1* | 7/2003 | Goldstone | 358/402 |
| 2003/0187941 A1* | 10/2003 | Suzuki | 709/206 |
| 2004/0068542 A1* | 4/2004 | Lalonde et al. | 709/206 |
| 2004/0177120 A1* | 9/2004 | Kirsch | 709/206 |
| 2004/0221014 A1* | 11/2004 | Tomkow | 709/206 |
| 2004/0260776 A1* | 12/2004 | Starbuck et al. | 709/206 |
| 2005/0198511 A1* | 9/2005 | Tomkow | 713/176 |
| 2005/0210152 A1* | 9/2005 | Hawes | 709/248 |
| 2005/0283624 A1* | 12/2005 | Kumar et al. | 713/300 |
| 2006/0015868 A1* | 1/2006 | Rechterman et al. | 718/1 |
| 2006/0031905 A1* | 2/2006 | Kwon | 725/108 |
| 2007/0011245 A1* | 1/2007 | Kawashima et al. | 709/206 |

* cited by examiner

SYSTEM AND METHOD FOR CONFIRMING THAT THE ORIGIN OF AN ELECTRONIC MAIL MESSAGE IS VALID

FIELD OF THE INVENTION

The present invention relates generally to data communications and computer networks, and more specifically to a system and method for confirming that the origin of an electronic mail ("e-mail") message is valid.

BACKGROUND OF THE INVENTION

Electronic mail ("e-mail") has become a fundamental enabling technology for businesses. Increasingly, e-mail is relied on for day to day communications between people located all over the world. Many kinds of commercial activity are now being performed over the Internet. In order for such activities to be dependably provided, Internet communications must be trusted. In this regard, e-mail spoofing, in which a malicious party creates a "rogue" e-mail message that appears to be from another party, or from an organization or associated domain other than the one it is actually transmitted from, is a serious problem. Domain Name System (DNS) servers can sometimes be attacked and used for this purpose, and there is currently no convenient mechanism for timely detection of a server having been compromised, and for preventing the transmission of rogue e-mail messages.

For the above reasons and others, it would be desirable to have a new system for enabling a service provider, such as an ISP (Internet Service Provider), to provide improved security with regard to detecting and preventing rogue e-mail messages resulting from e-mail spoofing.

SUMMARY OF THE INVENTION

To address the above described and other shortcomings of existing systems, a system and method for preventing e-mail spoofing are disclosed. In the disclosed system, a receiving checking system sends a confirmation request message back to a source confirmation system associated with a received e-mail message to determine if an originating system transmitted the message. The original message includes potentially unique key information, such as a transmission time and/or a randomly generated key value, that is also included in the confirmation request message. In one embodiment, a receiving checker server system sends a confirmation request e-mail message with a key extracted from a received message to confirmation server associated with the domain of the source indicated in the message. The confirmation request asks for a confirmation message indicating the sender sent a message including the key. For example, the confirmation message could indicate that the sender sent a message at the time indicated in the original message.

When a confirmation request is received at a confirmation server, it can reply with an indication that either the message was sent at the time indicated in the confirmation request and/or including the key indicated in the confirmation request message. Alternatively, the confirmation server may provide a denial message indicating that such a message was not sent. The confirmation server checks whether the message was in fact sent based on stored values for sent messages corresponding to the send time and/or optionally the message key from the confirmation request message. Receipt of the confirmation request message may also be used to provide an indication that the message was received at a the destination checker server, but not yet delivered to its ultimate destination.

The disclosed checking server operates in response to an indication that a source of a received message can be confirmed. Such an indication may be provided by a system manager as part of system configuration settings, as part of an out of band handshake between the sending and receiving systems, or through experience by the receipt of confirmation request messages or replies to confirmation request messages. Additionally, the disclosed system may be embodied such that a relatively centralized or shared database is maintained including indications of whether specific domains are capable of confirming and/or requesting confirmation of the origin of messages. Moreover, the e-mail message itself may include an indication that its origin can and/or should be confirmed. Such an indication may be included in any specific part of the message, including header and/or body portions of the message. In the case where a message includes an indication that it should be confirmed, then a timer may be associated with the message and used to determine whether a receiving domain that is capable of requesting confirmation is operating correctly. If such a timer expires, the sending system may use this information to contribute to a process for determining whether a spoofing attack is under way.

Various embodiments may use different message formats and/or communication protocols. The header of an e-mail message may be used to store an indication that a receiving server system, such as an e-mail gateway, can confirm that a particular e-mail message was sent from an originating system at a specific time. Moreover, an e-mail system itself may maintain a list, or other appropriate data structure or indication, of which source domains have the capability to confirm their sent e-mail messages. The knowledge of whether a domain is capable. Accordingly, based on such indication, a receiving system can determine that a problem has occurred if no confirmations are received from a domain that has the capability to make such confirmations.

Similarly, since a sending system may in some way mark domains from which it expects to receive e-mail confirmation requests with regard to the messages it sends a sender may be able to determine that its domain is under attack based on some lack of received confirmation requests. For example, if confirmation requests are not received from one destination domain from which they are expected, a sender may not immediately determine that a spoofing attack is under way. Instead, when one or some small number of messages sent to such a destination domain are not followed by receipt of corresponding confirmation requests, the sender may initiate some probe messages to be sent to domains that are known to be capable of responding with confirmation request messages. Such probe messages could be sent to some predetermined test e-mail account that is allocated for this purpose. Thus there may be a predetermined threshold number of sent messages and/or destination domains which do not result in receipt of confirmation request messages over some predetermined time period that may trigger a sender to conclude that an attack of some kind may be under way, or that some other problem is occurring.

In another aspect of the disclosed system, a confirmation request message may include a key or transmission time that is to be included in any confirmation message generated at the sender. Also, confirmation messages may explicitly be requested by the sender, and generated at various points in the receipt process, for example indicating that a sent message has been received but not delivered, or that the message has been successfully delivered to its ultimate destination, or that the message has been delivered and read by the user it is intended for. Moreover, any key or time of transmission information included in any of the messages used by the disclosed system may be located at any position within a message, and accordingly may be encrypted or not encrypted based on the security policies in place within the overall system in which a given embodiment is deployed and operates.

The disclosed system may advantageously enable a service provider, such as an ISP (Internet Service Provider), to provide improved security with regard to detecting and preventing rogue e-mail messages resulting from e-mail spoofing.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
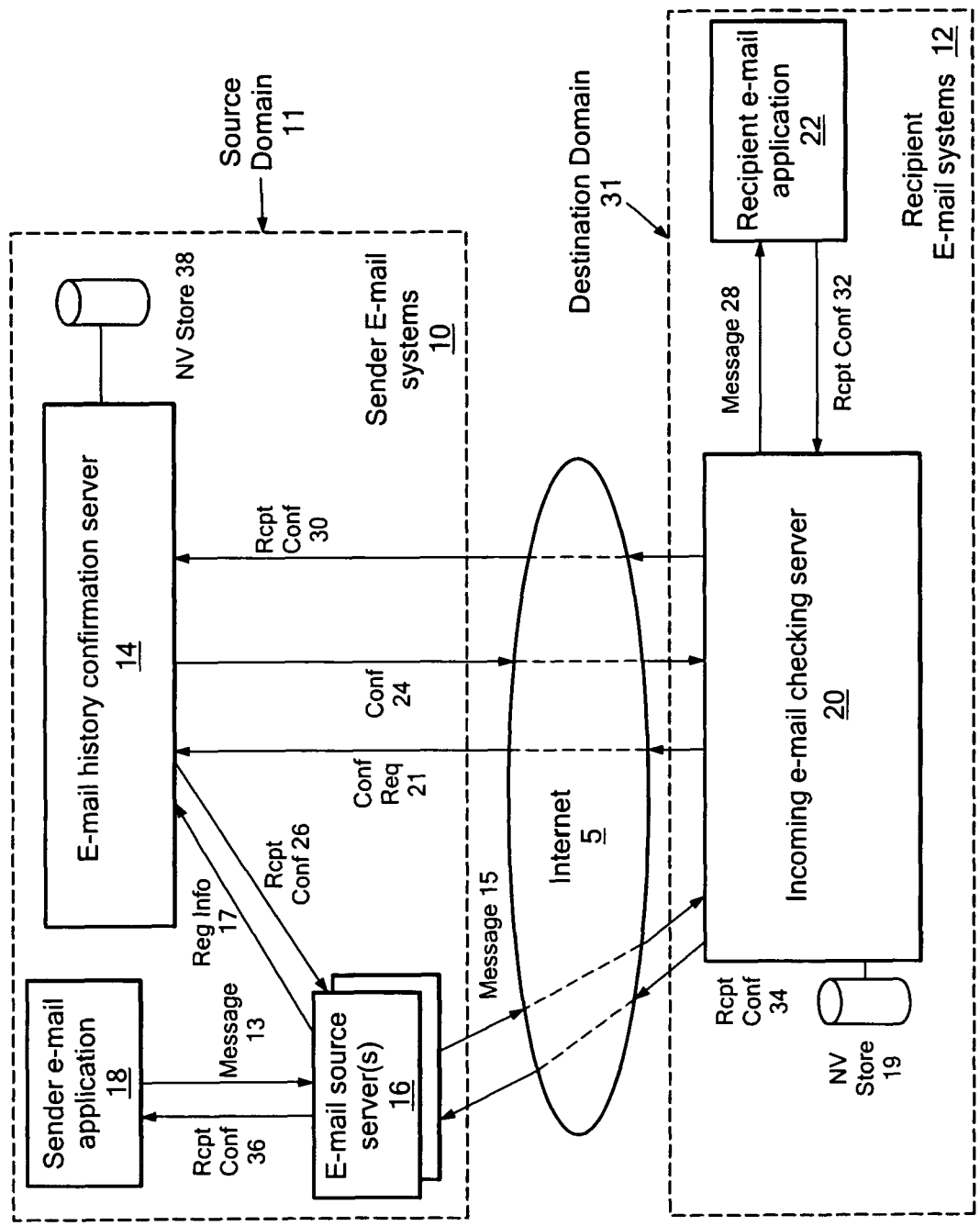
FIG. 1 is a block diagram illustrating the structure and operation of an embodiment of the disclosed system.

FIG. 1 shows devices in an operational environment of an embodiment of the disclosed system. As shown in FIG. 1, sender e-mail systems 10 and recipient e-mail systems 12 each include a number of devices providing computer software and/or hardware implemented functions. The sender e-mail systems 10 and recipient e-mail systems 12 may, for example, include one or more client and/or server computer systems, each having one or more processors and volatile and/or non-volatile program storage operable to store one or more computer programs, such as memory, secondary storage devices, and the like. Such computer systems may further include one or more I/O (input/output) devices and or communication or networking devices providing access to a computer network or other data communication system, such as the Internet 5 or a Local Area Network (LAN), through which the systems of FIG. 1 can exchange packets, frames, or other data messages, such as Internet Protocol (IP) packets.

The sender e-mail systems 10 may be associated with or contained in a source domain 11, while the recipient e-mail systems 12 may be associated with or contained in a destination domain 31. For example, in the present disclosure, the term "network domain" or "domain" may refer to those software and hardware systems associated with a corresponding Internet domain name, which may be a name chosen and registered by an organization and combined with a top level domain (TLD), such as ".com" or the like. Alternatively, the domains in the present disclosure may each consist of or include a subnetwork comprised of a group of client and server computer systems under the control of one management system and/or security database.

A sender e-mail application program 18, for example executing on a client computer system within sender e-mail systems 10, generates and sends an e-mail message 13 to the e-mail source server(s) 16. The e-mail messages communicated in the disclosed system may, for example, consist of any specific type of electronic mail message, generated using any specific e-mail application level protocol and/or application program. The e-mail message 13 from the sender e-mail application 18 is sent as e-mail message 15 to the incoming e-mail checking server system 20. The e-mail message 15 sent from the e-mail source server(s) 16 may optionally include a flag or other indication that the origin of the e-mail message can be confirmed, or a flag or other indication requesting that the origin of the e-mail message be confirmed. Additionally, the e-mail message 15 sent from the e-mail source server(s) 16 may include a randomly generated key that is uniquely associated with the message. For example, an e-mail source server may maintain a random number generator, or counter, or some other key generator for creating keys to be included in each e-mail message transmitted. Such flags and/or keys may, for example, be included in an application layer or other header portion of each transmitted e-mail message, or within the body of the message. In a preferred embodiment, each e-mail message transmitted from the e-mail source servers 16 includes an indication of the time at which the message was transmitted from the e-mail source servers 16 and an identifier associated with the sender e-mail application 18, such as a user's e-mail address. The sender identifier may further include an identifier of the source domain 11 and/or of the e-mail history confirmation server 14. For example, the format of the sender identifier may be "username@domainname.com", where the "domainname" portion of the sender identifier indicates the sending domain.

The e-mail source server 16 also registers message information 17 with the e-mail history confirmation server 14 regarding transmitted e-mail messages. Such registration information 17 may include a sender identifier consisting of the source e-mail address, a time the e-mail message was transmitted, and/or a unique key associated with the message. The e-mail history confirmation server 14 operates to store such information in the non-volatile storage 38. The e-mail history confirmation server 14 needs to store such information only for those messages whose origins have not yet been confirmed. Moreover, the messages themselves need not be stored on the e-mail history confirmation server 14.

The incoming e-mail checking server 20 stores the received e-mail message in the non-volatile storage 19 until the origin of the received e-mail message is confirmed, or until some predetermined time period expires without confirmation of the received message. The incoming e-mail checking server 20 sends an origin confirmation request message 21 to the e-mail history confirmation server 14, in response to information in the received e-mail message identifying the source domain 11 and/or the network address of the e-mail confirmation history server itself, which may, for example, be preconfigured through out of band communications or by a system administrator. The origin confirmation request message 21 requests confirmation that the received e-mail message was transmitted by the indicated sender from within the source domain 11, at the time specified in the received e-mail message, and/or including the unique message key copied from the message into the origin confirmation request message. The origin confirmation request message 21 may accordingly include the received e-mail message's transmission time and/or unique key, as well as a source domain identifier associated with the source domain 11, and/or a network address of the e-mail history confirmation server 14 generated or extracted from the received e-mail message. The origin confirmation request message 21 may further include a unique key of it own for use when sending back any resulting confirmation messages, in order to prevent spoofed confirmation messages from being inadvertently accepted.

In response to receipt of the origin confirmation request message, the e-mail history confirmation server 14 compares information in the request message to e-mail message history information, for example stored in the non-volatile storage 38. The e-mail history confirmation server 14 may, for example, check a database of e-mail history information based on a transmission time, message key, and/or other information from the origin confirmation request message 21. As a result of such checking, the e-mail history confirmation server 14 operates to send a confirmation message 24 to the incoming e-mail checking server 20, indicating whether the e-mail message identified by the e-mail origin confirmation request message 21 had been confirmed by checking the e-mail history information stored by the e-mail history confirmation server 14. In this way, the e-mail history confirmation server 14 provides an indication as to whether the origin of the received e-mail message was confirmed. If the received e-mail message is successfully confirmed, then the confirmation message 24 indicates that the received email message was sent by a sender within the source domain 11 and having the associated unique key, and/or at a transmission time specified by the e-mail source server(s) 16. Any confirmation message may further be generated such that it includes a unique key from the corresponding confirmation request message. The e-mail history confirmation server 14 may further operate to send a confirmation message 26 to the e-mail server(s) 16 confirming that an associated e-mail message was delivered at least as far as the incoming e-mail checking server 20, thus providing an indication that the e-mail message was delivered at least as far as the recipient's initial e-mail server or ISP. Such a confirmation message from the e-mail history confirmation server 14 to the e-mail source server 16 may, for example, be triggered at least in part based on configuration data, or based on selection of a feature provided in the sender e-mail application 18, possibly on a message by message basis.

In the event that no confirmation request message is received with respect to a transmitted message for which such a request message is expected within some predetermined time out period, then a retransmission of the message may be attempted. Such a time out may further contribute to a determination that a spoofing attack is underway in the case where multiple such time outs have occurred. Moreover, a sending system may operate to send some number of probe messages to a domain that fails to send a confirmation request message, but that is expected to do so. Such probe messages may be sent to other domains as well, in order to determine whether a fault or attack is underway. In this regard, a separate and potentially third-party probe message generating system may be used, and test-user e-mail accounts could be employed. Any stored messages that are maintained while waiting for an expected confirmation request message are eventually deleted and/or returned to the sending user as part of an indication of a failure to deliver them.

In the event that the received e-mail message is successfully confirmed, then the incoming e-mail server 20 may operate to forward the e-mail message 28 to the recipient e-mail application 22. If no origin confirmation message is received with respect to a given message within some predetermined time period following receipt of the message by the incoming e-mail checking server 20, an error condition may be triggered, causing an error message to be reported to a system manager or other user, and causing the received message to be discarded, or further analyzed to identify potentially malicious users and/or systems. Such error processing actions may similarly be performed in response to receipt of a origin confirmation message indicating that the received e-mail message was not transmitted from the source network domain 11 at the transmission time indicated in the received e-mail message.

If the confirmation server 14 receives a request for confirmation indicating a message that the confirmation server 14 has no record of being sent from within its associated domain, then the confirmation server 14 will send a confirmation message that is a denial, or negative confirmation message to the checking server. Receipt of a request for confirmation of a message that was not sent is a stronger indication of a significant problem, such as a spoofed message attack, then the failure to receive a confirmation request that is expected to be received. Accordingly, in response to receipt of a request for confirmation of a message that was not sent, the confirmation server 14 may operate to trigger an alarm, and provide notification of the potential problem in an message or the like sent to the checking server 20 that is indicated in the request for confirmation message.

As previously mentioned, in one embodiment, the disclosed system may operate to send a receipt confirmation message 30 back to the e-mail history confirmation server 14 in the event that the origin of the received message was successfully confirmed. Such a receipt confirmation message could be sent, for example, following forwarding of the received e-mail message from the incoming e-mail checking server to the recipient e-mail application 22. Moreover, generation and transmission of the receipt confirmation message 30 could be responsive to configuration data, and or a request for such a delivery confirmation contained in the received e-mail message itself. Receipt of the delivery confirmation at the e-mail confirmation server 14 may result in sending the delivery confirmation message 26 to one or more of the e-mail source server(s) 16, indicating to an original message sender that the e-mail message was delivered to the recipient e-mail application 22. Alternatively, the receipt confirmation message 34 may be transmitted directly to the e-mail source servers 16 from the checking server 20.

The incoming e-mail checking server 20 may further operate to store a local indication that the source domain 11 is capable of origin confirmation for e-mail messages. This enables the incoming e-mail checking server 20 to maintain a list or other indication of those domains from which it can expect e-mail messages implicitly or explicitly offering origin confirmations. This is advantageous in a situation where some, but not all domains have provided origin confirmation functionality, since alarms or other error indications can be suppressed for failure of the origin to offer to confirm, or to confirm the origin of a received e-mail message from a domain for which there is not a stored indication that this functionality is supported.

Similarly, the e-mail history confirmation server 14 may operate to store an indication that the destination domain 31 is operable to request origin confirmations. This enables systems in the source network domain 11 to determine whether origin confirmation requests should be expected for specific network domains, and to indicate an error in the event that an origin confirmation request is not received within some time out period in response to an e-mail sent to a network domain having such capability.

The disclosed system may further be embodied to send 32 a confirmation message from the recipient e-mail application 22 to the incoming e-mail checking server 20, which then forwards the confirmation to the e-mail source servers 16, which in turn forward the confirmation to the sender e-mail application 18. Confirmation messages need not be confirmed, e.g. no origin confirmation requests result from the receipt of confirmation messages.

Figure 2:
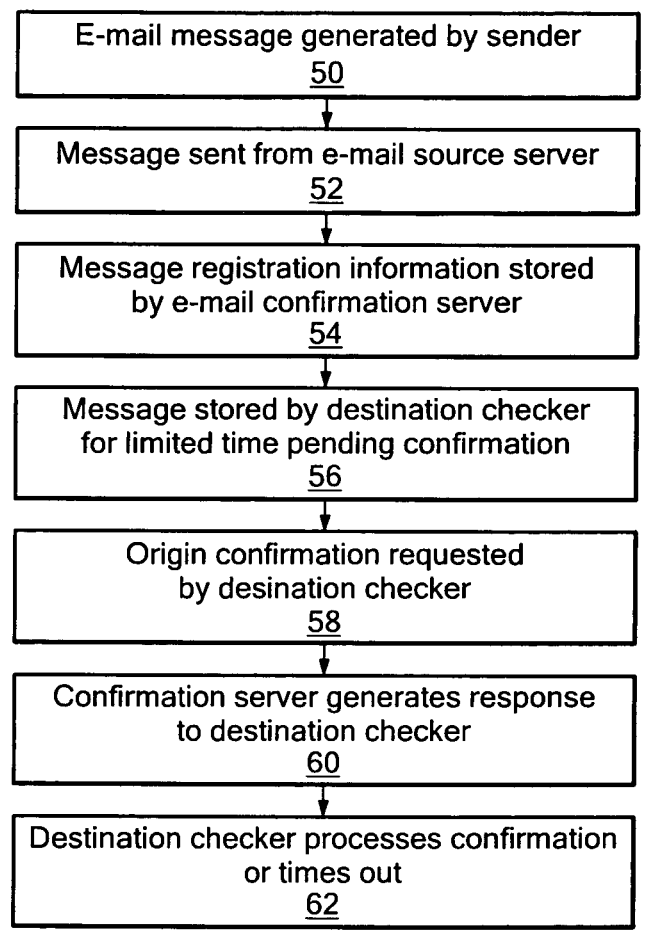
FIG. 2 is a flow chart illustrating steps performed by an embodiment of the disclosed system.

FIG. 2 is a flow chart illustrating some of the steps performed by one embodiment of the disclosed system. At step 50, an e-mail message is generated by a sending system, which may then pass the message to an e-mail source server for a source domain shared with the sending system. At step 52, the e-mail message is sent by the e-mail source server to an e-mail checking server associated with the destination network domain. Then, at step 54, registration information regarding the e-mail message is stored in a message history, for example in an e-mail history confirmation server. The information stored at step 54 is sufficient to confirm the e-mail message was originated by the sending system, and possibly also that the message was transmitted at an indicated time. The information stored at step 54 may include a randomly generated key uniquely identifying the e-mail message.

At step 56 the e-mail message is received and stored by the incoming e-mail checking server associated with the receiving domain. The message may be stored at the e-mail checking server or elsewhere prior to being passed to a recipient e-mail application for final delivery to a destination user, but only for a limited time. If the message is not confirmed prior to some time out period, then the message may be deleted or added to some record of unconfirmed messages for error processing purposes.

The e-mail checking server requests, at step 58, a confirmation that the e-mail message received at step 56 was transmitted from the source domain indicated in the received e-mail message. The confirmation request is transmitted to the e-mail history confirmation server associated with the source network domain indicated by the received e-mail message. The confirmation request may further include unique identifying information of its own, and generated by the receiving checking server in the destination domain, such as a randomly generated key.

The disclosed system then operates at step 60 to generate a confirmation message based on a message history associated with the source domain for the e-mail message. In the event that message identifying information contained in an origin confirmation request message does match information within the message history stored by the e-mail history confirmation server, then a positive indication is provided within a origin confirmation message transmitted from the e-mail history confirmation server to the incoming e-mail checking server. Otherwise, if the message identifying information within the confirmation request message does not at least substantially match information within the message history stored by an e-mail history confirmation server, then a negative indication is provided within an origin confirmation message transmitted from the e-mail history confirmation server to the incoming e-mail checking server. At step 62, the incoming e-mail checking server processes the received origin confirmation message. If there is a positive indication in the origin confirmation message, then the incoming e-mail checking server passes the received e-mail message the recipient e-mail application for final delivery. If there is a negative indication in the origin confirmation message, then the received e-mail message is not passed from the incoming e-mail checking server, and an error indication, flag, or alarm may be issued. Similarly, if no confirmation message is received by the incoming e-mail checking server within a predetermined time period following transmission of an origin confirmation message request, then the received e-mail message is not passed on to the recipient e-mail application, and this event may contribute to a determination of an error, resulting in the error indication, flag, or alarm being issued. Retransmission of confirmation request messages may also be attempted by a receiving checker server, under the assumption that a message may have simply been lost in the network.

Figure 3:
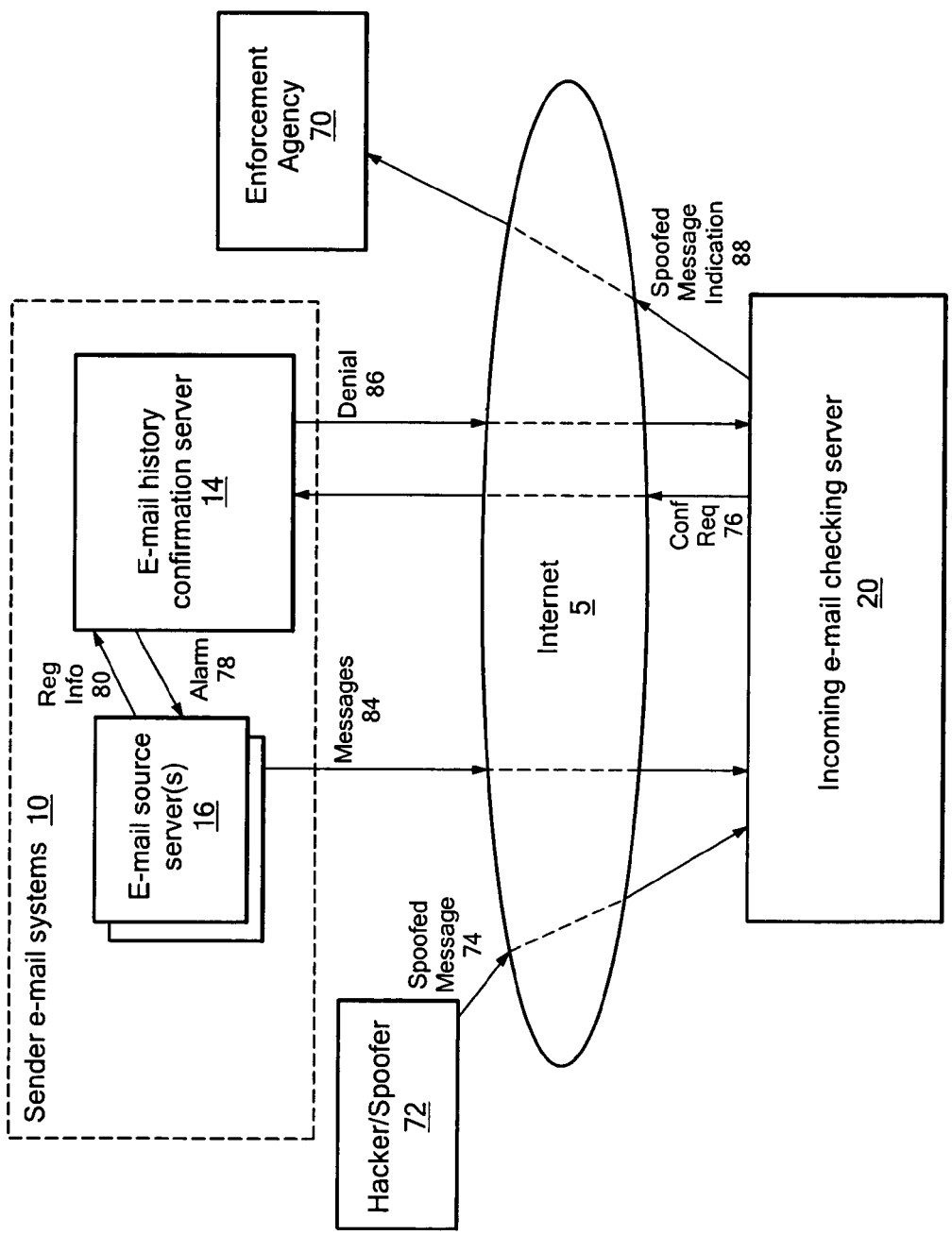
FIG. 3 is a block diagram illustrating operation of an embodiment of the disclosed system in a first example of an attack by a malicious entity producing spoofed e-mail messages.

FIG. 3 is a block diagram illustrating operation of an embodiment of the disclosed system in a first example of an attack by a hacker/spoofer entity 72. As shown in FIG. 3, a spoofed e-mail message 74 is sent from the hacker/spoofer entity 72 to a destination system associated with the incoming e-mail checking server 20. The spoofed e-mail message 74 includes a falsified indication that it was originated by one of the e-mail source servers 16 that are associated with the e-mail history confirmation server 14. For example, the e-mail source server 16 may be one or more e-mail server systems associated with a given Internet domain name, and the spoofed e-mail message 74 may include a source e-mail address including that Internet domain name. The incoming e-mail checking server 20 may have previously determined that messages received from the e-mail source servers 16 associated with the e-mail history confirmation server 14 can be confirmed by requests for confirmation sent to the e-mail history confirmation server 14, or the spoofed email message 74 may itself directly claim to be confirmable.

In either case, the incoming e-mail checking server 20 sends a confirmation request 76 to the e-mail history confirmation server 14. The confirmation request 76 may alternatively be sent to the e-mail source servers 16, which may then pass it on to the e-mail history confirmation server 14. The confirmation request 76 includes a time of transmission indicated in the spoofed e-mail 74, and potentially also a key or other information determined from the spoofed e-mail 74. Independently, the e-mail source servers 16 are transmitting e-mail messages 84 that may be processed by the incoming e-mail checking server 20, or by other similar incoming e-mail checking servers in other domains, or processed by conventional e-mail servers without checking capabilities, and sending message history registration information 80 for all sent e-mails to the e-mail history confirmation server 14 to use for responding to requests for confirmation with respect to those messages. For each message, the registration information 80 stored in the e-mail history confirmation server 14 may, for example, include date, time, source name, and optionally some confirmation key associated with the message.

Since the information describing the spoofed e-mail message 74 in the confirmation request 76 does not match any of the e-mail registration information 80 registered by any of the e-mail source servers 16, the e-mail history confirmation server 14 sends an alarm 78 to the e-mail source servers 16. The alarm 78 provides indication that a spoofed message has been sent falsely indicating the Internet domain of the e-mail source servers 16 as its source. The information exchanged between the e-mail source server(s) 16 and the e-mail history confirmation server 14 is trusted because, for example, it is communicated behind a firewall. The hacker/spoofer entity 72 accordingly cannot access or modify information exchanged between the e-mail source server 16 and the e-mail history confirmation server 14, such as the message history registration information 80.

The e-mail history confirmation server 14 further sends a denial 86 of the confirmation request 76 to the incoming e-mail checking server 20. The incoming e-mail checking server 20 then prevents the spoofed message from being delivered any end system, and provides an indication 88 of the spoofed e-mail, for example including a copy of the spoofed e-mail indicating its actual source, to an enforcement agency 70 and optionally back to the e-mail history confirmation server 14. The enforcement agency 70 can then use the information to pursue the hacker/spoofer entity 72.

Figure 4:
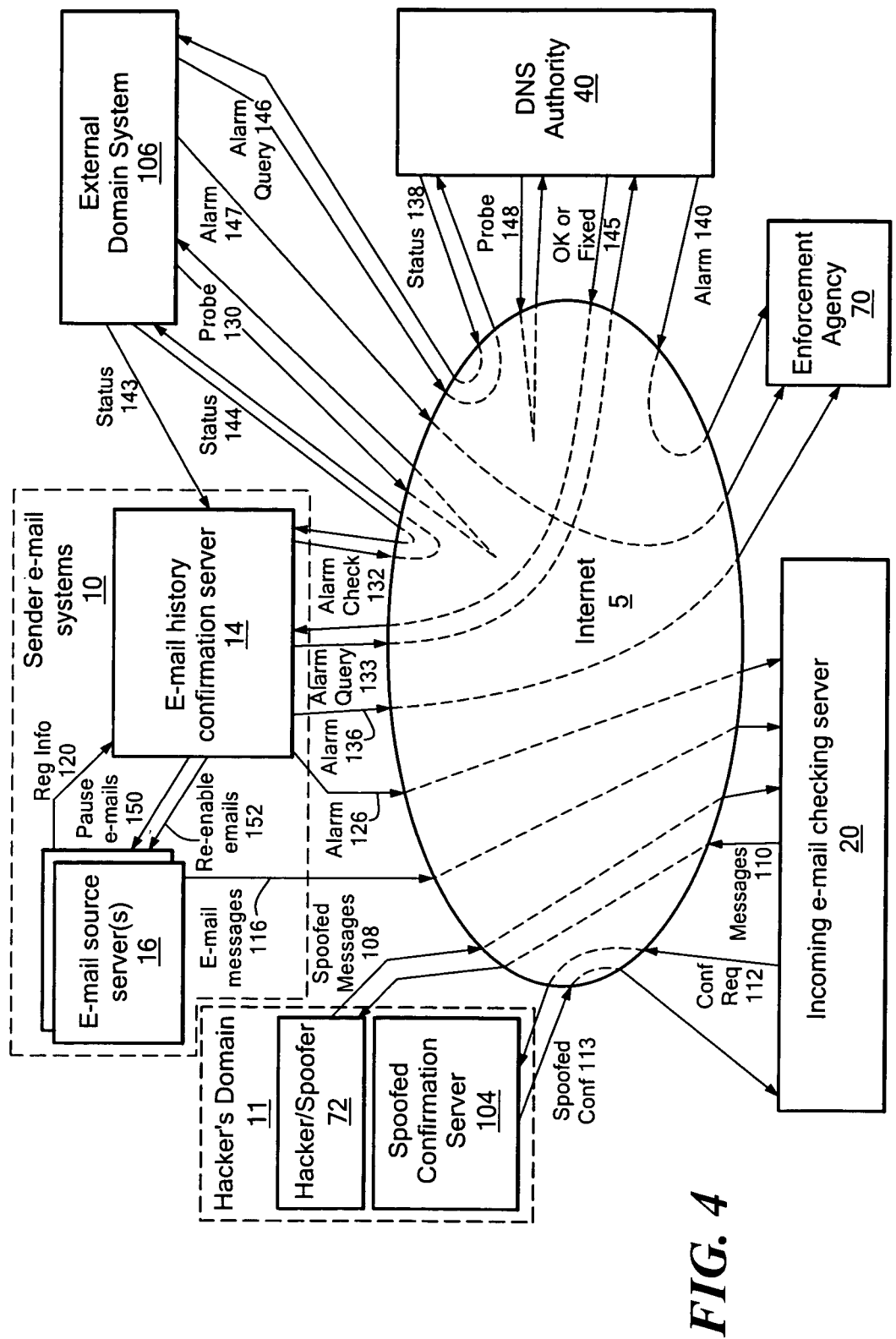
FIG. 4 is a block diagram illustrating operation of an embodiment of the disclosed system in an example of an attack by a malicious entity in which one or more DNS servers have been attacked.

FIG. 4 is a block diagram illustrating operation of an embodiment of the disclosed system in a second example of an attack by a hacker or spoofer. As shown in FIG. 4, a malicious party uses a hacker/spoofer source entity 72, as well as a spoofed confirmation server 104, both located in a Hacker's Domain 11. In this way, the malicious party is attempting to spoof both the original e-mail messages, and the message confirmation process itself. In this attack, the malicious party has modified DNS (Domain Name System) tables on the network to mis-direct messages addressed to the domain associated with the e-mail history confirmation server 14, so that they are received by the spoofed e-mail confirmation server 104. Accordingly, during operation, spoofed e-mail messages 108 from the hacker/spoofer 72, processed by the incoming e-mail checking server 20, result in confirmation requests 112 being sent from the incoming e-mail checking server 20 and subsequently being received by the spoofed confirmation server 104. Spoofed confirmation messages 113 are then sent from the spoofed confirmation server 104 to the e-mail checking server 20. Similarly, because of the hacking of the DNS tables, e-mail messages 110 from the incoming e-mail checking server 20, or other sources are mis-directed to be received by the hacker/spoofer 72.

In the same time period, e-mail messages 116 from the legitimate e-mail source servers 16 are independently being sent, and received by the incoming e-mail checking server 20, or by similar incoming e-mail checking servers in other domains. Associated message registration information 120 for those e-mail messages 116 is being passed to the e-mail history confirmation server 14. The e-mail history confirmation server 14 expects to receive confirmation requests for those e-mail messages 116, and sets one or more timers to expire in the event that such confirmation requests are not received within some time period. However, when any incoming e-mail checking server sends confirmation requests for those e-mail messages 116, they are mis-directed to the spoofed confirmation server 104, and not received by either the e-mail history confirmation server 14 or the e-mail source servers 16. Accordingly, one or more of the timers associated with the e-mail messages 116 will expire, indicating a potential network DNS problem. After similar timeouts occur as a result of sending to at least more than one such incoming e-mail server that is previously known to send confirmation requests, but without receiving confirmation requests, the e-mail history confirmation server 14 can interpret these multiple failures as more than just an individual failure of e-mail checking server 20, but as probably a network DNS problem.

At this stage the e-mail history confirmation server 14 may send an alarm check message 132 to an external domain system 106, asking it to check the DNS table entries for the domain associated with e-mail history confirmation server 14. Such an alarm check message between the e-mail history confirmation server 14 and the external domain system 106 may preferably be sent through a direct or private communication connection between the two systems, since messages may not be conveyable between the systems in the event of an actual DNS attack. Such a private communication connection may consist of any specific type of communication channel over which messages may be passed between the two systems without needing to traverse the internet 5. Moreover, it may additionally be desirable to use such a private communication connection in the face of a DNS attack, since an attacker that is intercepting messages from the sender e-mail systems 10 would otherwise be able to determine when their attack has been detected, and as a result take steps to cover their tracks and avoid identification. In response to the alarm check message 132, the external domain system 106 will test the internet 5 with one or more probe messages 130, checking the state of the DNS table entries associated with the domain of the e-mail history confirmation server 14. The external domain system 106 may further operate to communicate an alarm query message 146 to a DNS authority 40 if problems in the DNS tables are detected. The external domain system 106 may also send a status message 144 over the internet, or a status message 143 through a private communication connection, to the e-mail history confirmation server 14 with the results of its testing. Again, the internet may not be useful for providing communications between the external domain system 106 and the e-mail history confirmation server 14 in the event of an actual DNS attack.

The e-mail history confirmation server 14 may alternatively, or in addition, send an alarm query message 133 directly to the DNS authority 40 requesting that the DNS authority 40 verify that DNS table entries associated with the domain associated with the e-mail confirmation server 14 have not been corrupted. The DNS authority 40 checks DNS table entries using probe message 148. The DNS authority 40 can also fix them if necessary, and also may answer back to the e-mail history server 14 with a status message 145, and/or send status message 138 to the DNS authority 40, indicating whether there had been any corruption and for when it was fixed. If a DNS corruption has been confirmed, the DNS authorities may also send an alarm message 140, including details of any DNS hacking, to an enforcement agency 70. Alarms 136 and 147 from the e-mail confirmation server 14 and external domain system 106 respectively may also or alternatively be provided to the enforcement agency 70, again providing any known details regarding the DNS attack. It may similarly be desirable to provide alarm messages 136 and 147 through a communication connection external to the internet 5 in the face of such an attack, since the internet 5 may not be useable, and since such alarms might notify the malicious party that the attack has been detected.

In addition, an alarm message 126 may be sent to the incoming e-mail checking servers including e-mail checking server 20, indicating that e-mail messages purportedly received from the E-Mail source servers 16 are suspect, and optionally indicating that all emails for the suspect time period will be retransmitted.

Alarms generated in this way can further be used to trigger the DNS servers in the internet 5 to determine the identity and location of the hacker/spoofer 72 and the spoofed incoming e-mail checking server 104. This is an example of information that can further be passed on to the enforcement agency 70. Moreover, a time window during which e-mail messages received from the affected domain are questionable can be generated based on the time between the transmission of the first one of the legitimate e-mail messages 116 that did not result in a confirmation request, and when the hacked DNS tables are fixed. All e-mail messages received indicating a source within the affected domain during this period are questionable, and may need to be deleted if possible. The legitimate e-mail messages 116 sent during this corruption window may similarly need to be retransmitted. In order to limit the potential size of such a window of corruption, periodic probe e-mail messages may be sent at a sufficient frequency to ensure that confirmation requests are being generated by the incoming e-mail checking servers such as e-mail checking server 20, and correctly forwarded to the e-mail history confirmation server 14. Such probing could, for example, be performed 130 by the third party system 106. The probe 130 from the third party could accordingly be the result of a request from the e-mail source domain, or be periodically performed. However, before requesting the DNS authority 40 to perform probe 148, it would be desirable for the external domain system 106 to send probe 130, in order to determine whether the problem is the failure of the checking server for the receiving domain, such as incoming e-mail checking server 20. This is because of the costs that are likely to be involved in having a DNS authority do such a probe, which should preferably be avoided when unnecessary.

Also as shown in FIG. 4, the e-mail history confirmation server 14 may operate to inhibit the sending of e-mail messages from the e-mail source servers 16 during the period of the DNS attack by sending a pause emails message 150 upon detection of the attack. When the attack has been halted, the e-mail history confirmation server 14 may accordingly re-enable the sending of e-mail messages from the e-mail source servers 16 by sending re-enable e-mail message 152 to the e-mail source servers 16.

FIGS. 1-4 are flowchart and block diagram illustrations of methods and apparatus (systems) that may be embodied using software and/or hardware logic components. It will be understood that each block of the illustrations, and combinations of blocks in the illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the illustrative block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks within each figure. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the figures. Alternatively, the functions necessary to implement the invention may alternatively be embodied in part or in whole using hardware logic components such as Application Specific Integrated Circuits or any other specific types of hardware circuits, or some combination of hardware components and software. Accordingly, the blocks in the block diagrams and flowchart may be implemented in whole or in part using such hardware logic.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

We claim:

1. A Computer-Implemented method for confirming the origin of an electronic mail message, comprising:
   wherein said electronic mail message includes a transmission time at which said electronic mail message was transmitted by a sending system from which said electronic mail message was originated and a digital key uniquely associated with said message;
   storing, at an electronic mail history confirmation server, said transmission time and said digital key uniquely associated with said electronic mail message;
   receiving said electronic mail message at an incoming electronic mail checking server responsible for confirming electronic mail sent to a destination system;
   obtaining, by said incoming electronic mail checking server from said electronic mail message, responsive to said receiving said electronic mail message and an indication that said electronic mail message is confirmable, said transmission time and digital key from said origin confirmation field, and a sender identifier identifying said sending system from which said electronic mail message was originated;
   generating, by said incoming electronic mail checking server, an origin confirmation request message including said transmission time, said digital key and said sender identifier, wherein said origin confirmation request message requests confirmation that said electronic mail message was transmitted by said sending system at said transmission time;
   transmitting said origin confirmation request message from said incoming electronic mail checking server to said electronic mail history confirmation server;
   receiving said origin confirmation request message at said electronic mail history confirmation server;
   comparing, at said electronic mail history confirmation server, said transmission time and said digital key stored in said electronic mail history confirmation server with said transmission time and digital key in said origin confirmation request; and
   responsive to said digital key stored in said origin confirmation request message matching said digital key stored in said electronic mail history confirmation server, and said transmission time stored in said origin request message sufficiently matching said transmission time stored in said electronic mail history confirmation server, generating an affirmative origin confirmation message and transmitting said origin confirmation message from said electronic mail history confirmation server to said incoming electronic mail checking server, wherein said affirmative origin confirmation message indicates that said electronic mail message was transmitted by said sending system at said transmission time.

2. The method of claim 1, further comprising, responsive to no affirmative origin confirmation message indicating that said electronic mail message was transmitted by said sending system being received by said incoming electronic mail checking server within a predetermined time period following said transmitting of said origin confirmation request message, retransmitting said origin confirmation request message from said incoming electronic mail checking server to said electronic mail history confirmation server.

3. The method of claim 1, further comprising:
responsive to a denial message being received from said electronic mail history confirmation server by said incoming electronic mail checking server indicating that said received electronic mail message was not transmitted by said sending system, generating an error indication.

4. The method of claim 1, further comprising:
responsive to said affirmative origin confirmation message being received by said incoming electronic mail checking server, forwarding said electronic mail message from said incoming electronic mail checking server from said incoming electronic mail server to said destination system.

5. The method of claim 1, wherein said digital key comprises a randomly generated digital key.

6. The method of claim 1, further comprising:
extracting, by said incoming electronic mail checking server, a source domain identifier from said sender identifier in said electronic mail message; and
identifying, by said incoming electronic mail checking server, said electronic mail history confirmation server responsive to said domain identifier.

7. The method of claim 1, wherein said indication that said electronic mail message is confirmable is, at least in part, contained within said electronic mail message.

8. The method of claim 1, wherein said indication that said electronic mail message is confirmable is, at least in part, determined by said incoming electronic mail checking server prior to receipt of said message.

9. The method of claim 1, wherein said origin confirmation request message includes an origin confirmation request key, and further comprising including said origin confirmation request key in said affirmative origin confirmation message.

10. The method of claim 9, further comprising comparing, at said incoming electronic mail checking server, said origin confirmation request key with an origin confirmation request key included in said affirmative origin confirmation message, and, responsive to said origin confirmation request key included in said affirmative origin confirmation message not matching said origin confirmation request key, generating an error indication.

11. The method of claim 1, further comprising providing indication of a request for confirmation of initial receipt in said electronic mail message, and, responsive to said indication of said request for confirmation of initial receipt in said electronic mail message, providing an initial receipt confirmation message from said incoming electronic mail checking server.

12. The method of claim 1, further comprising providing indication of a request for confirmation of end system delivery in said electronic mail message, and, responsive to said indication of said request for confirmation of end system delivery in said electronic mail message, providing an end system delivery confirmation message from said incoming electronic mail checking server following delivery of said electronic mail message from said incoming electronic mail checking server to said destination system.

13. The method of claim 1, further comprising:
determining, by said electronic mail history confirmation server, responsive to receipt of said origin confirmation request message, that said message was received by said incoming electronic mail checking server; and
providing an indication of said receipt by said incoming electronic mail checking server to said sending system.

14. The method of claim 1, further comprising storing an indication that a destination domain associated said incoming electronic mail checking server is operable to generate origin confirmation request messages at said electronic mail history confirmation server.

15. The method of claim 14, further comprising generating an error indication responsive to said incoming electronic mail checking server failing to provide an origin confirmation request message in response to transmission of at least one message from a domain associated with said electronic mail history confirmation server.

16. The method of claim 14, wherein said storing of said indication that said destination domain including said incoming electronic mail checking server is operable to generate origin confirmation request messages is responsive to receipt of said origin confirmation request message.

17. A system for confirming the origin of an electronic mail message, said system including at least one processor and at least one computer readable memory, said computer readable memory having program code stored thereon, said program code executable by the at least one processor to perform:
wherein said electronic mail message includes a transmission time at which said electronic mail message was transmitted by a sending system from which said electronic mail message was originated and a digital key uniquely associated with said message;
storing, at an electronic mail history confirmation server, said transmission time and said digital key uniquely associated with said electronic mail message;
receiving said electronic mail message at an incoming electronic mail checking server responsible for confirming electronic mail sent to a destination system;
obtaining, by said incoming electronic mail checking server from said electronic mail message, responsive to said receiving said electronic mail message and an indication that said electronic mail message is confirmable, said transmission time and digital key from said origin confirmation field, and a sender identifier identifying said sending system from which said electronic mail message was originated;
generating, by said incoming electronic mail checking server, an origin confirmation request message including said transmission time, said digital key, and said sender identifier, wherein said origin confirmation request message requests confirmation that said electronic mail message was transmitted by said sending system at said transmission time; transmitting said origin confirmation request message from said incoming electronic mail checking server to said electronic mail history server;
receiving said origin confirmation request message at said electronic mail history confirmation server;
comparing, at said electronic mail history confirmation server, said transmission time and said digital key stored in said electronic mail history confirmation server with said transmission time and digital key in said origin confirmation request; and
responsive to said digital key stored in said origin confirmation request message matching said digital key stored in said electronic mail history confirmation server, and said transmission time stored in said origin request message sufficiently matching said transmission time stored in said electronic mail history confirmation server, generating an affirmative origin confirmation message and transmitting said origin confirmation message from said electronic mail history confirmation server to said incoming electronic mail checking server, wherein said affirmative origin confirmation message indicates that said electronic mail message was transmitted by said sending system at said transmission time.

18. The system of claim 17, wherein the program code is further executable to perform: responsive to no affirmative origin confirmation message indicating that said electronic mail message was transmitted by said sending system being received by said incoming electronic mail checking server within a predetermined time period following said transmitting of said origin confirmation request message, retransmitting said origin confirmation request message from said incoming electronic mail checking server to said electronic mail history confirmation server.

19. The system of claim 17, wherein the program code is further executable to perform: responsive to a denial message being received from said electronic mail history confirmation server by said incoming electronic mail checking server indicating that said received electronic mail message was not transmitted by said sending system, generating an error indication.

20. The system of claim 17, wherein the program code is further executable to perform: responsive to said affirmative origin confirmation message being received by said incoming electronic mail checking server" forwarding said electronic mail message from said incoming electronic mail server to said destination system.

21. The system of claim 17, wherein said digital key comprises a randomly generated digital key.

22. The system of claim 17, wherein the program code is further executable to perform: extracting, by said incoming electronic mail checking server, a source domain identifier from said sender identifier in said electronic mail message; and identifying, by said incoming electronic mail checking server, said electronic mail history confirmation server responsive to said domain identifier.

23. The system of claim 17, wherein said indication that said electronic mail message is confirmable is, at least in part, contained within said electronic mail message.

24. The system of claim 17, wherein said indication that said electronic mail message is confirmable is, at least in part, determined by said incoming electronic mail checking server prior to receipt of said message.

25. The system of claim 17, wherein said origin confirmation request message includes an origin confirmation request key, and wherein the program code is further executable to perform including said origin confirmation request key in said affirmative origin confirmation message.

26. The system of claim 25, wherein the program code is further executable to perform comparing, at said incoming electronic mail checking server, said origin confirmation request key with an origin confirmation request key included in said affirmative origin confirmation message, and, responsive to said origin confirmation request key included in said affirmative origin confirmation message not matching said origin confirmation request key, generating an error indication.

27. The system of claim 17, wherein the program code is further executable to perform providing indication of a request for confirmation of initial receipt in said electronic mail message, and, responsive to said indication of said request for confirmation of initial receipt in said electronic mail message, providing an initial receipt confirmation message from said incoming electronic mail checking server.

28. The system of claim 17, wherein the program code is further executable to perform providing indication of a request for confirmation of end system delivery in said electronic mail message, and, responsive to said indication of said request for confirmation of end system delivery in said electronic mail message, providing an end system delivery confirmation message from said incoming electronic mail checking server following delivery of said electronic mail message from said incoming electronic mail checking server to said destination system.

29. The system of claim 17, wherein the program code is further executable to perform: determining, by said electronic mail history confirmation server, responsive to receipt of said origin confirmation request message, that said message was received by said incoming electronic mail checking server; and providing an indication of said receipt by said incoming electronic mail checking server to said sending system.

30. The system of claim 17, wherein the program code is further executable to perform storing an indication that a destination domain associated said incoming electronic mail checking server is operable to generate origin confirmation request messages at said electronic mail history confirmation server.

31. The system of claim 30, wherein the program code is further executable to perform generating an error indication responsive to said incoming electronic mail checking server failing to provide an origin confirmation request message in response to transmission of at least one message from said domain associated with said electronic mail history confirmation server.

32. The system of claim 30, wherein said storing of said indication that said destination domain including said incoming electronic mail checking server is operable to generate origin confirmation request messages is responsive to receipt of said origin confirmation request message.

33. A system for confirming the origin of an electronic mail message:
wherein said electronic mail message includes a transmission time at which said electronic mail message was transmitted by a sending system from which said electronic mail message was originated and a digital key uniquely associated with said message;
means for storing, at an electronic mail history confirmation server, said transmission time and said digital key uniquely associated with said electronic mail message;
means for receiving said electronic mail message at an incoming electronic mail checking server responsible for confirming electronic mail sent to a destination system;
means for obtaining, by said incoming electronic mail checking server from said electronic message, responsive to said receiving said electronic mail message and an indication that said electronic mail message is confirmable, said transmission time and digital key from said origin confirmation field, and a sender identifier identifying said sending system from which said electronic mail message was originated;
means for generating, by said incoming electronic mail checking server, an origin confirmation request message including said transmission time, said digital key and said sender identifier, wherein said origin confirmation request message requests confirmation that said electronic mail message was transmitted by said sending system at said transmission time;
means for transmitting said origin confirmation request message from said incoming electronic mail checking server to said electronic mail history confirmation server;

means for receiving said origin confirmation request message at said electronic mail history confirmation server;

means for comparing, at said electronic mail history confirmation server, said transmission time and said digital key stored in said electronic mail history confirmation server with said transmission time and digital key in said origin confirmation request; and means for, responsive to said digital key stored in said origin confirmation request message matching said digital key stored in said electronic mail history confirmation server, and said transmission time stored in said origin request message sufficiently matching said transmission time stored in said electronic mail history confirmation server, generating an affirmative origin confirmation message and transmitting said origin confirmation message from said electronic mail history confirmation server to said incoming electronic mail checking server, wherein said affirmative origin confirmation message indicates that said electronic mail message was transmitted by said sending system at said transmission time.

34. A computer program product including a computer readable memory having program code stored thereon for confirming the origin of an electronic mail message, said program code executable by the at least one processor to perform:

wherein said electronic mail message includes a transmission time at which said electronic mail message was transmitted by a sending system from which said electronic mail message was originated and a digital key uniquely associated with said message;

storing, at an electronic mail history confirmation server, said transmission time and said digital key uniquely associated with said electronic mail message;

receiving said electronic mail message at an incoming electronic mail checking server responsible for confirming electronic mail sent to a destination system;

obtaining, by said incoming electronic mail checking server from said electronic mail message, responsive to said receiving said electronic mail message and an indication that said electronic mail message is confirmable, said transmission time and digital key from said origin confirmation field, and a sender identifier identifying said sending system from which said electronic mail message was originated;

generating, by said incoming electronic mail checking server, an origin confirmation request message including said transmission time, said digital key, and said sender identifier, wherein said origin confirmation request message requests confirmation that said electronic mail message was transmitted by said sending system at said transmission time;

transmitting said origin confirmation request message from said incoming electronic mail checking server to said electronic mail history server;

receiving said origin confirmation request message at said electronic mail history confirmation server;

comparing, at said electronic mail history confirmation server, said transmission time and said digital key stored in said electronic mail history confirmation server with said transmission time and digital key in said origin confirmation request; and responsive to said digital key stored in said origin confirmation request message matching said digital key stored in said electronic mail history confirmation server, and said transmission time stored in said origin request message sufficiently matching said transmission time stored in said electronic mail history confirmation server, generating an affirmative origin confirmation message and transmitting said origin confirmation message from said electronic mail history confirmation server to said incoming electronic mail checking server, wherein said affirmative origin confirmation message indicates that said electronic mail message was transmitted by said sending system at said transmission time.

35. The method of claim 1, further comprising:

generating an error indication responsive to a predetermined time period expiring after said transmitting of said origin confirmation request message without receipt by said incoming electronic mail checking server of an affirmative origin confirmation message from said electronic mail history confirmation server indicating that said received electronic mail message was transmitted by said sending system.

36. The system of claim 17, wherein the program code is further executable to perform:

generating an error indication responsive to a predetermined time period expiring after said transmitting of said origin confirmation request message without receipt by said incoming electronic mail checking server of an affirmative origin confirmation message from said electronic mail history confirmation server indicating that said received electronic mail message was transmitted by said sending system.

* * * * *